United States Patent
Hann et al.

(10) Patent No.: US 6,700,872 B1
(45) Date of Patent: Mar. 2, 2004

(54) METHOD AND SYSTEM FOR TESTING A UTOPIA NETWORK ELEMENT

(75) Inventors: William P. Hann, Round Rock, TX (US); Gregory L. Singleton, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/209,589

(22) Filed: Dec. 11, 1998

(51) Int. Cl.⁷ .................. G01R 31/11; G06F 11/277
(52) U.S. Cl. .................. 370/241; 370/247; 370/252
(58) Field of Search .................. 370/241, 242, 370/247, 250, 251, 252

(56) References Cited

U.S. PATENT DOCUMENTS

| | | | |
|---|---|---|---|
| 4,771,425 A | 9/1988 | Baran et al. | 370/458 |
| 4,819,228 A | 4/1989 | Baran et al. | 370/389 |
| 4,903,261 A | 2/1990 | Baran et al. | 370/396 |
| 4,975,906 A | 12/1990 | Takiyasu et al. | 370/401 |
| 4,985,889 A | 1/1991 | Frankish et al. | 370/395.3 |
| 5,020,058 A | 5/1991 | Holden et al. | 370/474 |
| 5,059,925 A * | 10/1991 | Weisbloom | 331/1 A |
| 5,072,449 A | 12/1991 | Enns et al. | 714/776 |
| 5,088,032 A | 2/1992 | Bosack | 709/242 |
| 5,115,431 A | 5/1992 | Williams et al. | 370/394 |
| 5,119,403 A | 6/1992 | Krishnan | 375/261 |
| 5,128,945 A | 7/1992 | Enns et al. | 714/776 |
| 5,197,062 A * | 3/1993 | Picklesimer | 370/508 |
| 5,224,099 A | 6/1993 | Corbalis et al. | 370/412 |
| 5,255,291 A | 10/1993 | Holden et al. | 375/362 |
| 5,274,631 A | 12/1993 | Bhardwaj | 370/401 |
| 5,274,635 A | 12/1993 | Rahman et al. | 370/352 |
| 5,274,643 A | 12/1993 | Fisk | 370/238 |
| 5,313,454 A | 5/1994 | Bustini et al. | 370/231 |
| 5,317,562 A | 5/1994 | Nardin et al. | 370/428 |
| 5,359,592 A | 10/1994 | Corbalis et al. | 370/233 |

(List continued on next page.)

FOREIGN PATENT DOCUMENTS

| | | |
|---|---|---|
| WO | WO 95/20282 | 7/1995 |
| WO | WO 96/04729 | 2/1996 |

OTHER PUBLICATIONS

"Utopia Specification Level 1, Version 2.01," (af–phy–0017.000), *The ATM Forum Committee*, Mar. 21, 1994, 19 pages.

Anthony Alles, "ATM Internetworking," *Cisco Systems, Inc.*, May 1995, 59 pages.

"Utopia Level 2, Version 1.0," (af–phy–0039.000), *The ATM Forum Committee*, Jun. 1995, 69 pages.

*Primary Examiner*—Hassan Kizou
*Assistant Examiner*—Saba Tsegaye
(74) *Attorney, Agent, or Firm*—Baker Botts L.L.P.

(57) ABSTRACT

A method for testing a network element includes receiving from a network element into a buffer (40) a first clock signal (25) of the network element. The method includes receiving into the buffer (40) from a first port (31) of the network element a first plurality of data values to be verified in response to the first clock signal (25). The method also includes transferring a second plurality of data values to be verified to a second port (32) of the network element in response to a second clock signal (29), and comparing the second plurality of data values with the first plurality of data values.

A system for testing a network element includes a testing element operable to couple a first port (31) to a second port (32) of a network element. The testing element is operable to receive a first plurality of data values from the first port of the network element and to transfer a second plurality of data values to the second port of the network element. The system also includes a data processing element (75) operable to couple to the network element to compare the first plurality of data values transferred from the network element with the second plurality of data values received by the network element.

40 Claims, 3 Drawing Sheets

U.S. PATENT DOCUMENTS

| | | | |
|---|---|---|---|
| 5,394,394 A | 2/1995 | Crowther et al. | 370/392 |
| 5,422,880 A | 6/1995 | Heitkamp et al. | 370/352 |
| 5,430,715 A | 7/1995 | Corbalis et al. | 370/392 |
| 5,434,863 A | 7/1995 | Onishi et al. | 370/402 |
| 5,452,306 A | 9/1995 | Turudic et al. | 370/465 |
| 5,461,624 A | 10/1995 | Mazzola | 370/402 |
| 5,473,599 A | 12/1995 | Li et al. | 370/219 |
| 5,473,607 A | 12/1995 | Hausman et al. | 370/392 |
| 5,509,006 A | 4/1996 | Wilford et al. | 370/401 |
| 5,517,488 A | 5/1996 | Miyazaki et al. | 370/225 |
| 5,519,704 A | 5/1996 | Farinacci et al. | 730/402 |
| 5,555,244 A | 9/1996 | Gupta et al. | 370/397 |
| 5,561,663 A | 10/1996 | Klausmeier | 370/468 |
| 5,561,669 A | 10/1996 | Lenney et al. | 370/352 |
| 5,570,360 A | 10/1996 | Klausmeier et al. | 370/232 |
| 5,583,862 A | 12/1996 | Callon | 370/397 |
| 5,598,581 A | 1/1997 | Daines et al. | 710/52 |
| 5,604,741 A | 2/1997 | Samueli et al. | 370/402 |
| 5,612,957 A | 3/1997 | Gregerson et al. | 370/401 |
| 5,617,417 A | 4/1997 | Sathe et al. | 370/394 |
| 5,617,421 A | 4/1997 | Chin et al. | 370/402 |
| 5,666,353 A | 9/1997 | Klausmeier et al. | 370/230 |
| 5,673,265 A | 9/1997 | Gupta et al. | 370/432 |
| 5,691,997 A | 11/1997 | Lackey, Jr. | 714/807 |
| 5,729,546 A | 3/1998 | Gupta et al. | 370/434 |
| 5,732,079 A | 3/1998 | Castrigno | 370/362 |
| 5,737,526 A | 4/1998 | Periasamy et al. | 709/241 |
| 5,737,635 A | 4/1998 | Daines et al. | 710/52 |
| 5,740,171 A | 4/1998 | Mazzola et al. | 370/392 |
| 5,740,176 A | 4/1998 | Gupta et al. | 370/440 |
| 5,742,604 A | 4/1998 | Edsall et al. | 370/401 |
| 5,742,649 A | 4/1998 | Muntz et al. | 375/371 |
| 5,764,636 A | 6/1998 | Edsall | 370/401 |
| 5,764,641 A | 6/1998 | Lin | 370/412 |
| 5,765,032 A | 6/1998 | Valizadeh | 709/235 |
| 5,787,070 A | 7/1998 | Gupta et al. | 370/217 |
| 5,787,255 A | 7/1998 | Parlan et al. | 709/233 |
| 5,793,763 A | 8/1998 | Mayes et al. | 370/389 |
| 5,793,978 A | 8/1998 | Fowler | 709/226 |
| 5,796,732 A | 8/1998 | Mazzola et al. | 370/362 |
| 5,802,042 A | 9/1998 | Natarajan et al. | 370/255 |
| 5,805,595 A | 9/1998 | Sharper et al. | 370/442 |
| 5,812,618 A | 9/1998 | Muntz et al. | 375/372 |
| 5,822,383 A * | 10/1998 | Muntz et al. | 375/362 |
| 5,835,036 A | 11/1998 | Takefman | 341/95 |
| 5,835,481 A | 11/1998 | Akyol et al. | 370/395.53 |
| 5,835,494 A | 11/1998 | Hughes et al. | 370/397 |
| 5,835,725 A | 11/1998 | Chiang et al. | 709/228 |
| 5,838,915 A | 11/1998 | Klausmeier et al. | 709/215 |
| 5,838,994 A | 11/1998 | Valizadeh | 710/56 |
| 5,859,550 A | 1/1999 | Brandt | 327/156 |
| 5,864,542 A | 1/1999 | Gupta et al. | 370/257 |
| 5,867,666 A | 2/1999 | Harvey | 709/239 |
| 5,982,772 A * | 11/1999 | Oskouy | 370/395.7 |
| 6,005,865 A | 12/1999 | Lewis et al. | 370/398 |
| 6,123,735 A * | 9/2000 | Raghavan et al. | 703/21 |
| 6,249,875 B1 * | 6/2001 | Warren | 713/400 |
| 6,256,308 B1 * | 7/2001 | Carlsson | 370/395.43 |
| 6,333,915 B1 * | 12/2001 | Fujita | 370/223 |
| 6,345,052 B1 * | 2/2002 | Tse et al. | 370/395.6 |
| 6,347,084 B1 * | 2/2002 | Hulyalkar et al. | 370/347 |
| 6,356,557 B1 * | 3/2002 | Nichols et al. | 370/395.1 |

* cited by examiner

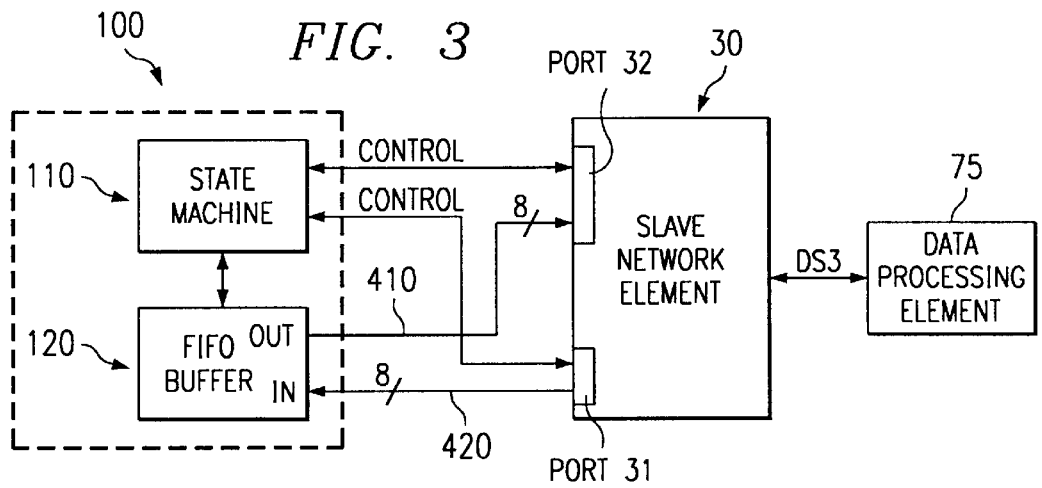
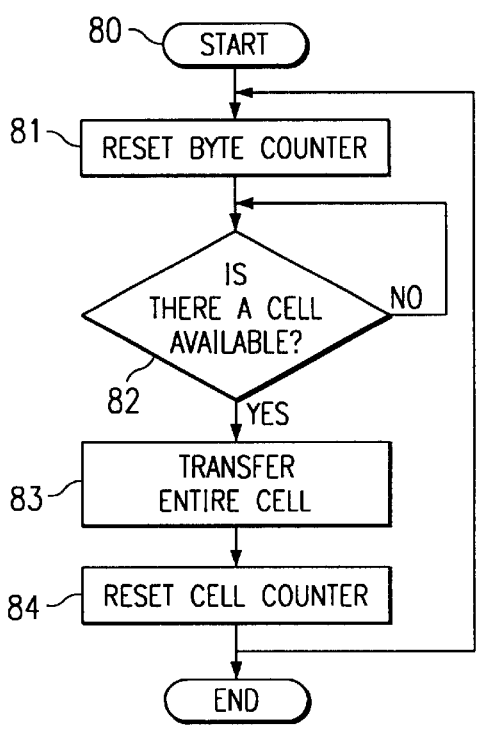
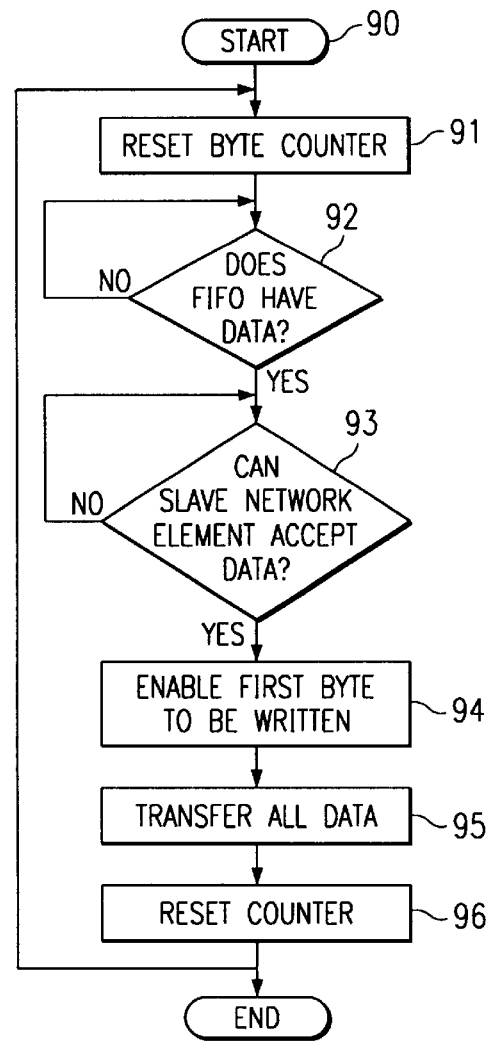

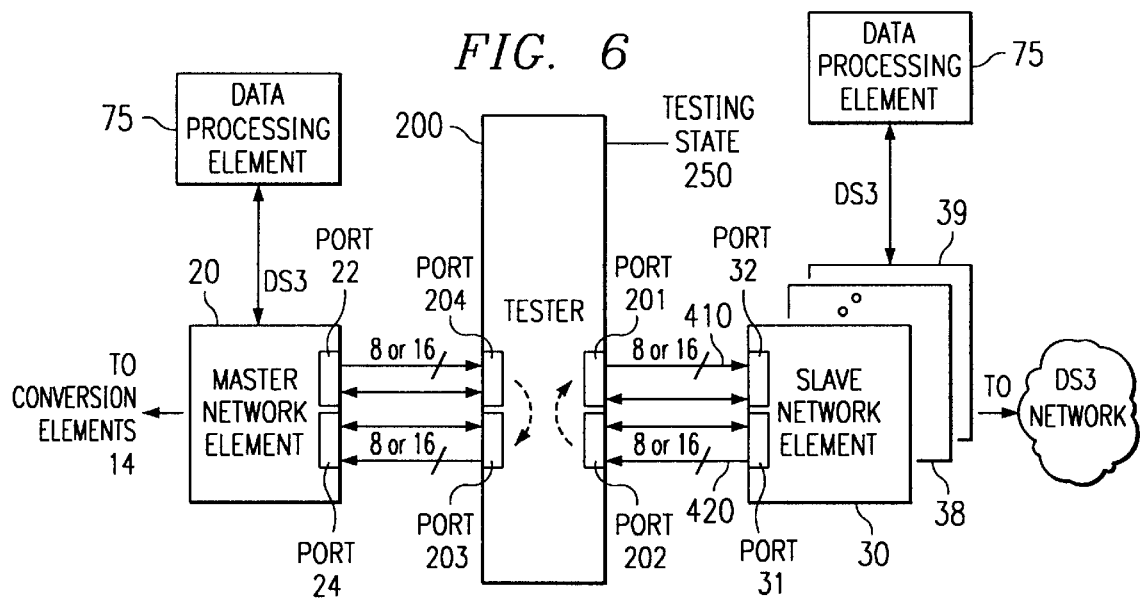
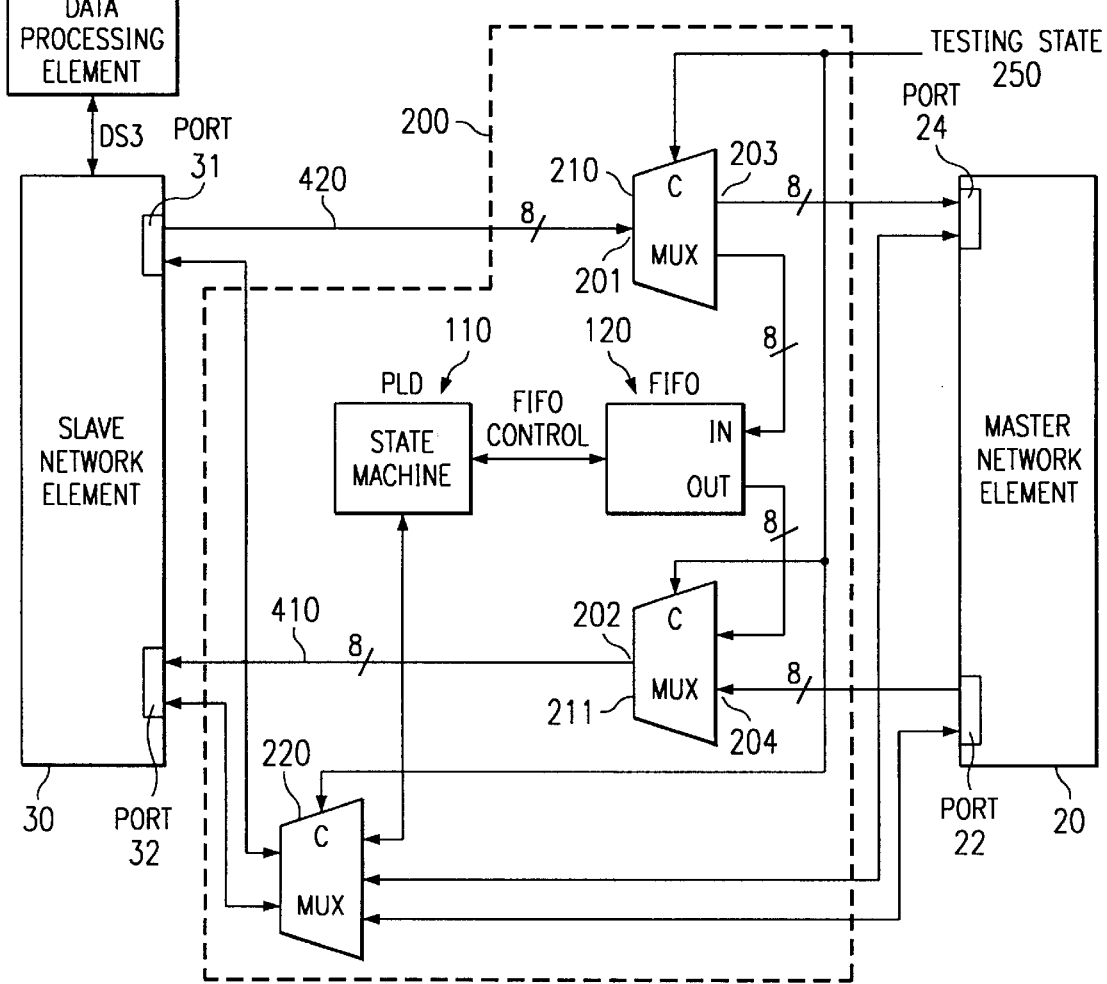

METHOD AND SYSTEM FOR TESTING A UTOPIA NETWORK ELEMENT

TECHNICAL FIELD OF THE INVENTION

This invention relates generally to the field of telecommunication systems and networks and more particularly to a method and system for testing a network element that uses a standard Universal Test and Operations Physical Interface (UTOPIA) for asynchronous transfer mode (ATM) network element.

BACKGROUND OF THE INVENTION

Manufacturers of network equipment encounter increasingly complex data transfer design issues as networks and network devices have evolved into sophisticated systems. An increasing number of network systems now utilize asynchronous transfer mode (ATM) technology, which provides a more effective way to transfer data across a network.

The design of these networks requires a method to test the integrity of data transfer between elements in the network in order to isolate any faults in data transmission. These manufacturers require an efficient and effective means to test the operability of network elements in such networks. One desirable means to test this operability is to test network elements that use the UTOPIA interface protocol. UTOPIA is a standard ATM interface that provides a protocol for various configurations of data cells that are available for transfer across the network.

Network elements utilizing a UTOPIA interface have, in some implementations, traditionally been tested utilizing a method and design that require the use of both the network element and the device to which the network element is transferring data. One example of such a network element is a network interface module, which may transfer data to a device such as a subtending host module board. A subtending host module board permits coupling of additional networks. A disadvantage associated with this traditional approach is that this approach requires the use of both the network interface module as well as the subtending host module.

Another disadvantage associated with this approach is that this approach requires an external controller or processor. An external oscillator is also necessary to provide a clock signal for data testing.

SUMMARY OF THE INVENTION

Accordingly, a need has arisen for an improved method and system for testing a UTOPIA network element. The present invention includes a system and method that provides a highly flexible and usable means to test a UTOPIA network element that addresses the shortcomings of prior systems and methods.

According to one embodiment of the invention, a method for testing a network element includes receiving from a network element into a buffer a first clock signal of the network element. The method includes receiving into the buffer from a first port of the network element a first plurality of data values to be verified in response to the clock signal. The method also includes transferring a second plurality of data values to be verified to a second port of the network element in response to a second clock signal, and comparing the second plurality of data values with the first plurality of data values.

According to another embodiment of the invention, a system for testing a network element includes a testing element operable to couple a first port to a second port of a network element. The testing element is operable to receive a first plurality of data values from the network element in response to a first clock signal of the network element and to transfer a second plurality of data values to the network element in response to a second clock signal of the network element. The system also includes a data processing element operable to couple to the network element to compare the first plurality of data values transferred from the network element with the second plurality of data values received by the network element.

According to another embodiment of the invention, a system for testing a network element includes a first in first out buffer operable to couple a first port to a second port of a network element. The first in first out buffer is operable to receive a first plurality of data values from the first port of the network element in response to a first clock signal of the network element and to transfer a second plurality of data values to the second port of the network element in response to a second clock signal of the network element. The system also includes a data processing element operable to couple to the network element to compare the first plurality of data values transferred from the network element with the second plurality of data values received by the network element.

According to another embodiment of the invention, a method for testing a network element includes receiving from a network element into a state machine a first state variable. The method includes receiving a first plurality of data values from a first port of the network element into a buffer. The buffer is controlled by the state machine. The method also includes transferring from the buffer to a second port of the network element a second plurality of data values, and comparing the first plurality of data values with the second plurality of data values.

According to another embodiment of the invention, a system for testing a network element includes a testing element operable to couple a first port to a second port of a network element. The testing element is operable to receive a first plurality of data values from the first port of the network element and to transfer a second plurality of data values to the second port of the network element. The system also includes a data processing element operable to couple to the network element to compare the first plurality of data values transferred from the network element with the second plurality of data values received by the network element.

According to another embodiment of the invention, a system for testing a network element includes a buffer operable to couple a first port to a second port of a network element. The buffer is operable to receive a first plurality of data values from the first port of the network element and to transfer a second plurality of data values to the second port of the network element. The system also includes a state machine coupled to the buffer. The state machine is further operable to control the buffer, and further operable to couple the first port to the second port of the network element. The system also includes a data processing element operable to couple to the network element to compare the first plurality of data values transferred from the network element with the second plurality of data values received by the network element.

Embodiments of the invention provide numerous technical advantages. For example, in one embodiment of the invention, testing can be performed on inputs which originate solely from the network element to be tested. Thus, the network element provides a controlling clock signal, removing the need for an additional oscillator. Another advantage of one embodiment of the invention is that the design further teaches a method of testing the network element which requires no controller or processor.

Yet another advantage of one embodiment of the invention provides for a means to isolate a master network element from other network elements. Yet another advantage of one embodiment of the invention provides for a means to isolate the bus from the rest of the network and to test the bus. This permits not only more effective testing and verifying the integrity of the plurality of data values, but also a more generic application of the same design to test any UTOPIA network element. Another advantage of one embodiment of the invention is that the invention permits testing of both UTOPIA I and UTOPIA II network elements.

BRIEF DESCRIPTION OF THE DRAWINGS

For a more complete understanding of the present invention, the objects and advantages thereof, reference is now made to the following descriptions taken in connection with the accompanying drawings in which:

FIG. 3 is a block diagram illustrating a system for testing a slave network element according to the teachings of the present invention;

FIG. 4 is a flowchart illustrating a method for transferring a plurality of data values from the slave network element to a slave testing element;

FIG. 5 is a flowchart illustrating a method for transferring a plurality of data values from the slave testing element to the slave network element;

FIG. 6 is a block diagram illustrating another embodiment of the invention to test a UTOPIA network element; and FIG. 7 is a block diagram illustrating detail of the embodiment of the system for testing a slave network element shown in FIG. 6 according to the teachings of the present invention.

DETAILED DESCRIPTION OF THE INVENTION

Embodiments of the present invention and its advantages are best understood by referring to FIGS. 1 through 7 of the drawings, like numerals being used for like and corresponding parts of the various drawings.

Figure 1:
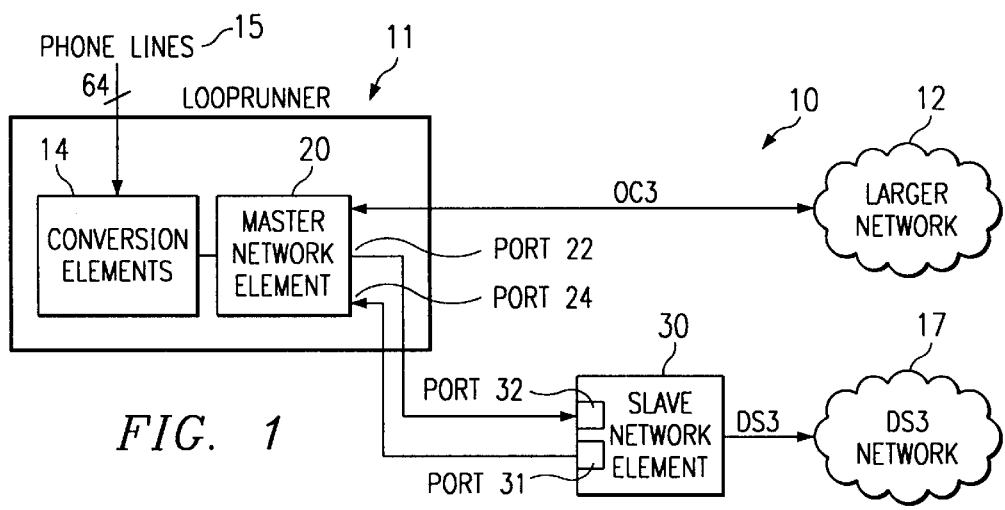
FIG. 1 is a block diagram illustrating example network elements in a telecommunications system utilizing the UTOPIA technology.

FIG. 1 is a block diagram of a telecommunications network 10 illustrating example network elements that utilize the UTOPIA technology. Telecommunications network 10 is used to transfer data to and from phone lines 15. Telecommunications network 10 includes a digital subscriber loop access multiplexer (DSLAM) 11 and a slave network element 30. Telecommunications network 10 may be coupled to a larger network 12 via a suitable data communications channel such as an OC3 link, and to another network such as DS3 network 17, via a DS3 link.

DSLAM 11 includes conversion elements 14 and master network element 20. DSLAM 11 transfers data between phone lines 15 and larger network 12. Data from phone lines 15 enters conversion elements 14 of DSLAM 11. Conversion elements 14 convert the data to a format utilizing a UTOPIA interface protocol for transfer to master network element 20. The formatted data is transferred to larger network 12 by master network element 20. Formatted data may also be transferred to slave network element 30 for subsequent transfer to DS3 network 17 via a DS3 communications link. Network elements, such as master network element 20 and slave network element 30, that utilize the UTOPIA interface protocol may include, but are not limited to, devices such as network interface modules, subtending host modules, cell multiplexers, and switches. In this embodiment, master network element 20 is a network interface module, and slave network 30 is a subtending host module.

Master network element has a first port 22 and a second port 24 for transferring and receiving electrical signals. Slave network element 30 has a first port 31 and a second port 32 for transferring and receiving electrical signals. Slave network element 30 couples to master network element 20 by a channel that originates at first port 22 and terminates at second port 32. Slave network element also couples to master network element 20 by a channel originating at first port 31 and terminating at second port 24. Slave network element 30 also couples to DS3 network 17 via a suitable data communications channel such as DS3. Master network element 20 may be any network element that controls data transfer to slave network element 30. Slave network element 30 may be any network element that receives data transferred from master network element 20. Master network element 20 and slave network element 30 are further detailed in UTOPIA interface specifications entitled *The ATM Forum Technical Committee UTOPIA Specification Level* 1, version 2.01,#af-phy-0017.000, (March, 1994) and *The ATM Forum Technical Committee UTOPIA Specification Level* 2, version 1.0, #af-phy-0039.000 (June, 1995).

Data traveling between network elements, such as master network element 20 and slave network element 30, in telecommunications network 10 is configured as a plurality of data values in accordance with the UTOPIA protocol. The plurality of data values is typically comprised of 53 bytes. The plurality of data values comprises header and data fields that may be verified to ensure data integrity.

A UTOPIA I interface is used to transfer data between master network element 20 and slave network element 30. A UTOPIA II interface permits master network element 20 to transfer data to a plurality of slave network elements 30, . . . 38, 39, as shown; in FIG. 6. Additional operational details may be found in UTOPIA interface specifications entitled, The ATM Forum Technical Committee UTOPIA *Specification Level* 1, version 2.01, #af-phy-0017.000, (March, 1994) and *The ATM Forum Technical Committee UTOPIA Specification Level* 2, version 1.0, #af-phy-0039.000 (June, 1995).

In networks such as telecommunications network 10, it is desirable to test the operability of network elements such as master network element 20 and slave network element 30. FIGS. 2–7 illustrate various embodiments and methods to perform such testing according to the teachings of the present invention.

Figure 2:
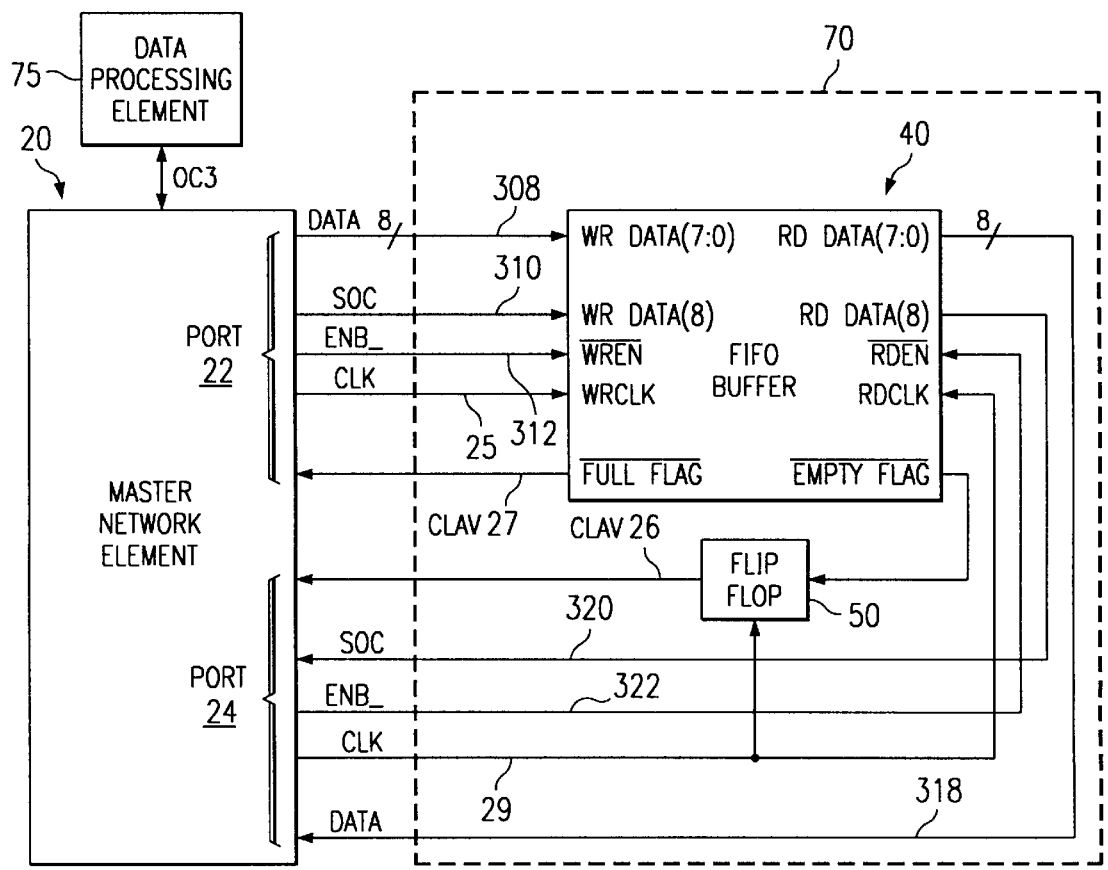
FIG. 2 is a block diagram illustrating a system for testing a master network element according to the teachings of the present invention.

FIG. 2 is a block diagram that illustrates one embodiment of a system for testing master network element 20 as shown in FIG. 1. In this embodiment, master network element 20 is isolated from telecommunications network 10 and more accurately tested by using a master testing element 70 in conjunction with a data processing element 75. During testing of master network element 20, master testing element 70 couples first port 22 of the master network element 20 to second port 24 of master network element 20, in place of slave network element 30. In this embodiment, master testing element 70 includes a first in first out buffer 40 and a state machine, in this case a flip flop 50. First in first out buffer 40 is coupled to both first port 22 and second port 24. First in first out buffer 40 is also coupled to flip flop 50. Flip flop 50 is coupled to second port 24 of master network element 20. Data processing element 75 is coupled to master network element 20 via an OC3, or other suitable, link.

Testing master network element 20 first includes transferring a first plurality of data values 308, 310 from master network element 20 to master testing element 70. Testing then includes transferring a second plurality of data values 318, 320 from master testing element 70 to master network element 20. Clock signals 25 and 29 from master network element 20 are utilized for these transfers between master network element 20 and master testing element 70. Testing concludes with comparing the first and second pluralities of data values by data processing element 75.

Master network element 20 transfers the first plurality of data values 308, 310 from first port 22 to first in first out buffer 40. When master testing element 70 is ready to receive the first plurality of data values 308, 310, master testing element 70 transfers a state variable 27, designated "CLAV 27", to master network element 20. Master network element 20 then transfers a state variable 312 to enable transfer of the first plurality of data values 308, 310 to first in first out buffer 40. Master network element 20 then transfers the first plurality of data values 308, 310 to master testing element 70. First in first out buffer 40 utilizes master network element's 20 clock signal 25 and receives the first plurality of data values 308, 310.

First in first out buffer 40 may then transfer the second plurality of data values 318, 320 to second port 24 of master network element 20. To initiate the transfer, first in first out buffer 40 transfers a state variable 26, designated "CLAV 26", to flip flop 50. State variable 26 designates that first in first out buffer 40 may transfer the second plurality of data values. Master network element 20 receives state variable 26 from flip flop 50. Flip flop 50 enables state variable 26 to be delayed one clock cycle. This delay permits use of clock signal 29 of the master network element 20 to initiate a timely transfer of all 53 bytes of the second plurality of data values 318, 320 from first in first out buffer 40. Master network element 20 then transfers a state variable 322 to enable transfer of the second plurality of data values 318, 320 to second port 24. First in first out buffer 40 then transfers the second plurality of data values 318, 320 into second port 24.

Testing master network element 20 is then completed by comparing the first plurality of data values 308, 310 transferred by master network element 20 with the second plurality of data values 318, 320 received by master network element 20 by data processing element 75. In one embodiment, data processing element 75 is a suitable standard testing device, such as an Adtech AX4000. Data processing element 75 may be coupled to master network element 20 via any suitable standard telecommunications interface, such as a UTOPIA bus, OC3, T1, or DS3 link. If the second plurality of data values 318, 320 received by master network element 20 are equivalent to the first plurality of data values 308, 310 transferred by master network element 20, master network element 20 is causing no corruption in the process of transferring data. On the other hand, a difference between the second plurality of data values 318, 320 received by master network element 20 and the first plurality of data values 308, 310 transferred by master network element 20 indicates that some corruption has occurred as a result of improper functioning of master network element 20. Therefore, a simple, reliable method for testing a master network element that does not require an external clock is provided.

FIG. 3 is a block diagram illustrating a system to test UTOPIA I slave network element 30. In this embodiment, slave network element 30 may be isolated from telecommunications network 10 and more accurately tested by a slave testing element 100 used in conjunction with data processing element 75. During testing, slave testing element 100 couples first port 31 to second port 32 of slave network element 30, in place of master network element 20. In this embodiment, slave testing element 100 includes a first in first out buffer 100 and a state machine 110. First in first out buffer 120 couples to first port 31 and second port 32 of slave network element 30. State machine 110 couples to first in first out buffer 120 and to first port 31 and second port 32 of slave network element 30. State machine 110 is a device operable to execute an algorithm, and may be one of many embodiments known to those'skilled in the art, such as a programmable logic device, software, a discrete implementation, or within ASIC, LSI, or VLSI circuitry. Data processing element 75 is coupled to slave network element 30 via a DS3 link.

Testing slave network element 30 first includes transferring a first plurality of data values 420 from slave network element 30 to slave testing element 100. Testing then includes transferring-a second plurality of data values 410 from slave testing element 70 to slave network element 30. State machine 110 controls these transfers of data values between first in first out buffer 120 and slave network element 30. Testing concludes with comparing the first and second pluralities of values 420, 410 by data processing element 75.

Slave network element 30 transfers the first plurality of data values 420 from first port 31 to first in first out buffer 120. The process for transferring the first plurality of data values 420 from slave network element 30 to first in first out buffer 120 is described in detail in FIG. 4. When first in first out buffer 120 has received the first plurality of data values 420, first in first out buffer 120 may then transfer the second plurality of data values 410 to second port 32 of slave network element 30. The process for transferring the second plurality of data values 410 from first in first out buffer 120 to slave network element 30 is described in detail in FIG. 5.

Testing slave network element 30 is then completed by comparing the first plurality of data values 420 transferred by slave network element 30 with the second plurality of data values 410 received by slave network element 30 by data processing element 75. As discussed in conjunction with FIG. 2, in one embodiment, data processing element 75 is a suitable, standard testing device, such as an Adtech AX4000. Data processing element 75 may be coupled to master network element 20 via any suitable standard telecommunications interface, such as a UTOPIA bus, OC3, T1, or DS3 link. If the second plurality of data values 410 received by slave network element 30 are equivalent to the first plurality of data values 420 transferred by slave network element 30, slave network element 30 is causing no corruption in the process of transferring data. On the other hand, a difference between the second plurality of data values 410 received by slave network element 30 and the first plurality of data values 420 transferred by slave network element 30 indicates that some corruption has occurred as a result of improper functioning of slave network element 30. Other suitable standard testing devices may also be used to compare the second plurality of data values 410 received by slave network element 30 and the first plurality of data values 420 transferred from slave network element 30.

Slave testing element 100 may also test a plurality of UTOPIA II slave network elements 30, . . . , 38, 39. This embodiment of the invention illustrated in FIG. 6 utilizes either UTOPIA I or UTOPIA II interface protocol, which permits slave testing element 100 to poll the plurality of slave network elements 30, . . . , 38, 39 for testing.

FIG. 4 is a flowchart illustrating a method used by state machine 110 for transferring the first plurality of data values 420 from slave network element 30 to slave testing element 100, as shown in FIG. 3. Transfer of the first plurality of data values 420 from slave network element 30 to slave testing element 100 begins at step 80. At step 81, state machine 110 initializes a byte counter to zero. State machine 110 queries slave network element 30 until slave network element 30 has the first plurality of data values 420 available for transfer at step 82. When slave network element 30 responds that the first plurality of data values 420 are available for transfer, state machine 110 first transfers state variables to both slave network element 30 and first in first out buffer 120 at step 83. Slave network element 30 then transfers the first plurality of data values 420 to first in first out buffer 120. State machine 110 then resets the byte counter at step 84 upon completing the transfer of the first plurality of data values 420.

FIG. 5 is a flowchart illustrating a method used by state machine 110 for transferring the second plurality of data values 410 from slave testing element 100 to slave network element 30, as shown in FIG. 3. Transfer of the second plurality of data values 410 from state machine 110 begins at step 90. State machine 110 initializes a byte counter to zero at step 91. State machine 110 then queries first in first out buffer 120 as to whether first in first out buffer 120 has the second plurality of data values 410 available for transfer at step 92. When first in first out buffer 120 responds that the second plurality of data values 410 are available to transfer, state machine 110 queries slave network element 30 as to whether slave network element 30 may receive the second plurality of data values 410 at step 93. When slave network element 30 responds that slave network element 30 may receive the second plurality of data values 410, state machine 110 transfers state variables to both slave network element 30 and first in first out buffer 120 at step 94. First in first out buffer 120 then transfers the first byte of the second plurality of data values 410 to slave network element 30. First in first out buffer 120 transfers the remainder of the second plurality of data values 410 to slave network element 30 at step 95. State machine 110 then resets the byte counter upon completing the transfer of the second plurality of data values 410 at step 96.

FIG. 6 is a block diagram illustrating another embodiment of the invention to test a UTOPIA I or UTOPIA II network element. Tester 200 may be inserted between slave network element 30 and master network element 20, as shown in FIG. 6. This insertion permits testing of either network element 20 or 30 without removing master network element 20 or slave network element 30 from telecommunications network 10. A first port 201 of tester 200 is coupled to second port 32 of slave network element 30, and a second port 202 is coupled to first port 31 of slave network element 30. Tester 200 also couples to first port 22 of master network element 20 at a third port 204. A fourth port 203 of tester 200 couples to second port 24 of master network element 20. Data processing elements 75 are coupled to master network element 30 and slave network element 30 via suitable communications links.

In normal operation, master network element 20 transfers data to slave network element 30 via ports 204 and 201 of tester 200. Similarly, slave network element 30 may transfer data to master network element 20 via ports 202 and 203 of tester 200. To test master network element 20, a testing state 250 may activate tester 200, which will couple first port 22 to second port 24 of master network element 20. Testing state 250 is a state variable and may be, for example, automatically generated by some test configuration, or generated by a user who desires to test slave network element 30.

Upon activation of tester 200, master network element 20 may be tested as described in conjunction with FIG. 2. Similarly, to test slave network element 30, testing state 250 may activate tester 200, which will couple first port 31 to second port 32 of slave network element 30. Upon activation of tester 200, UTOPIA I slave network element 30 may be tested as described in conjunction with FIGS. 3–5. Testing UTOPIA I slave network element 30 in this embodiment is discussed in more detail in FIG. 7. Tester 200 may also test a plurality of UTOPIA II slave network elements 30, . . . , 38, 39, as discussed in conjunction with FIG. 3.

FIG. 7 is a block diagram illustrating in more detail the embodiment of the system for testing a UTOPIA I slave network element 30 as shown in FIG. 6. In this embodiment, tester 200 comprises multiplexers 210, 211, and 220. Tester 200 also comprises state machine 110 coupled to first in first out buffer 120. Multiplexers 210, 211, and 220 allow normal data transfer between slave network element 30 and master network element 20. Multiplexers 210, 211, and 220 also allow testing of slave network element 30 upon activation of tester 200.

Multiplexers 210, 211, and 220 are suitable circuits that may be used to couple master network element 20, slave network element 30 and tester 200. In particular, multiplexers 210 and 211 provide an interface for the first and second pluralities of data values 420, 410, and multiplexer 220 provides an interface for a plurality of state variables. Multiplexers 210, 211, and 220 are known to those skilled in the art and may also be devices that provide any suitable selection function, such as switches or tri-state devices. Testing state 250 controls multiplexers 210, 211, and 220, and activates tester 200 for testing.

Multiplexers 210 and 220 couple first port 31 of slave network element 30 to second port 24 of master network element 20. Similarly, multiplexers 211 and 220 couple second port 32 of slave network element 30 to first port 22 of master network element 20. Multiplexers 210, 211, and 220 also couple to first in first out buffer 120 for testing slave network element 30. Multiplexer 220 also couples to state machine 110 for testing slave network element 30.

During testing, multiplexers 210, 211, and 220 couple first port 31 to second port 32 of slave network element 30. As discussed in conjunction with FIG. 3, testing slave network element 30 first includes transferring a first plurality of data values 420 from slave network element 30 to tester 200. Testing then includes transferring a second plurality of data values 410 from slave tester 200 to slave network element 30. State machine 110, coupled to multiplexer 220 and to first in first out buffer 120, controls these transfers of data values between first in first out buffer 120 and slave network element 30. This control process is described in conjunction with FIGS. 4 and 5. Testing concludes with comparing the first and second pluralities of values 420, 411 by data processing element 75.

Tester 200 may be manufactured in several embodiments without departing from the scope of the invention. For example, FIG. 7 shows tester 200 on a bus between slave network element 30 and master network element 20. Tester 200 may also be placed on a single board with slave network element 30. Tester 200 may also be manufactured with slave network element 30 inside a single integrated circuit. These embodiments isolate testing of slave network element 30 without introducing bus errors.

Testing slave network element 30 is then completed by comparing the first plurality of data values 420 transferred by slave network element 30 with the second plurality of data values 410 received by slave network element 30 by a data processing element 75. As discussed in conjunction with FIG. 3, in one embodiment, data processing element 75 is a standard testing device, such as an Adtech AX4000. Data processing element 75 may be coupled to master network element 20 via any suitable standard telecommunications interface, such as a UTOPIA bus, OC3, T1, or DS3 link. If the second plurality of data values 410 received by slave network element 30 are equivalent to the first plurality of data values 420 transferred, slave network element 30 is causing no corruption in the process of transferring data. On the other hand, a difference between the second plurality of data values 410 received by slave network element 30 and the first plurality of data values 420 transferred by slave network element 30 indicates that some corruption has occurred as a result of improper functioning of slave network element 30. Other suitable devices may also be used to compare the second plurality of data values received by slave network element 30 with the first plurality of data values transferred by slave network element 30.

While the invention has been particularly shown and described by the foregoing detailed description, it will be understood by those skilled in the art that various other changes in form and detail may be made without departing from the spirit and scope of the invention.

What is claimed is:

1. A system comprising:
    a testing element operable to couple a first port of a network element to a second port of the network element, the testing element operable to receive a first plurality of data values from the network element in response to a first clock signal of the network element, the testing element further operable to communicate a state variable to the network element indicating that the testing element is ready to transfer a second plurality of data values to the network element and to transfer the second plurality of data values to the network element in response to a second clock signal of the network element, wherein the network element utilizes UTOPIA interface protocol to exchange information with the testing element;
    a state device coupled to the testing element and the second port of the network element operable to delay communication of the state variable by at least one clock cycle of the network element; and
    a data processing element operable to couple to the network element, the data processing element further operable to compare the first plurality of data values transferred from the network element with the second plurality of data values received by the network element and to detect an error in the operation of the UTOPIA interface protocol based on the comparison.

2. The system of claim 1 further comprising the network element having the first port and the second port, the network element operable to transfer the first plurality of data values to be verified and to receive the second plurality of data values to be verified.

3. The system of claim 1 wherein the network element is a master network element.

4. The system of claim 1 wherein the first plurality of data values are the same as the second plurality of data values.

5. The system of claim 1 wherein the testing element comprises a buffer coupled to the state device, the buffer further operable to couple to the first port of the network element, the buffer operable to receive the first plurality of data values and to transfer the second plurality of data values.

6. The system of claim 1, wherein the state device comprises a flip-flop.

7. The system of claim 1 wherein the testing element further comprises:
    at least one data selection element operable to couple to the network element, the data selection element controlled by a testing state; and
    at least one state selection element operable to couple to the network element, the state selection element controlled by the testing state.

8. A system comprising:
    a first in first out buffer operable to couple a first port of a network element to a second port of the network element, the first in first out buffer further operable to receive a first plurality of data values to be verified from the first port of the network element in response to a first clock signal of the network element, the first in first out buffer further operable to communicate a state variable to the network element indicating that the first in first out buffer is ready to transfer a second plurality of data values to the network element and to transfer the second plurality of data values to the second port of the network element in response to a second clock signal of the network element, wherein the network element utilizes UTOPIA interface protocol to exchange information with the first in first out buffer;
    a state device coupled to the first in first out buffer and the second port of the network element, the state device operable to delay communication of the state variable by at least one clock cycle of the network element; and
    a data processing element operable to couple to the network element, the data processing element further operable to compare the first plurality of data values transferred from the network element with the second plurality of data values received by the network element and to detect an error in the operation of the UTOPIA interface protocol based on the comparison.

9. The system of claim 8 further comprising the network element having the first port and the second port, the network element operable to tansfer the first plurality of data values to be verified, the network element further operable to receive the second plurality of data values to be verified.

10. The system of claim 8 wherein the network element is a master network element.

11. The system of claim 8 wherein the state device comprises a flip flop.

12. The system of claim 8 further comprising:
    at least one data selection element operable to couple to the network element and to the first in first out buffer, the data selection element controlled by a testing state; and
    at least one state selection element operable to couple to the network element and to the first in first out buffer, the state selection element controlled by the testing state.

13. The system of claim 12 wherein the testing state comprises a state variable generated to initiate testing.

14. The system of claim 12 wherein the state selection element comprises a multiplexer.

15. A method for testing a network element, comprising:
receiving from a network element into a buffer a first clock signal of the network element;
receiving into the buffer from a first port of the network element a first plurality of data values to be verified in response to the first clock signal, wherein the network element utilizes UTOPIA interface protocol to exchange information with the buffer;
communicating a state variable to the network element indicating that a second plurality of data values to be verified is ready for transfer, wherein the state variable is communicated with a delay of at least one clock cycle of the network element;
transferring a second plurality of data values to be verified to a second port of the network element in response to a second clock signal;
comparing the first plurality of data values with the second plurality of data values; and
detecting an error in the operation of the UTOPIA interface protocol based on the comparison.

16. The method of claim 15 wherein the network element is a master network element.

17. The method of claim 15 wherein the first plurality of data values is the same as the second plurality of data values.

18. The method of claim 15 wherein:
the state variable is communicated through a flip flop; and
the second plurality of values is communicated through the flip flop.

19. A system composing:
a first in first out buffer operable to couple a first port of a network element to a second port of the network element, the first in first out buffer further operable to receive a first plurality of data values from the first port of the network element, the first in first out buffer further operable to transfer a second plurality of data values to the second port of the network element, wherein the network element utilizes UTOPIA interface protocol to exchange information with the first in first out buffer;
a state machine coupled to the first in first out buffer, the state machine operable to control the first in first out buffer, the state machine further operable to couple to the network element, the state machine further operable to transfer at least one state variable to the network element and to delay transfer of the state variable by at least one clock cycle of the network element; and
a data processing element operable to couple to the network element, the data processing element further operable to compare the first plurality of data values transferred from the network element with the second plurality of data values received by the network element and to detect an error in the operation of the UTOPIA interface protocol based on the comparison.

20. The system of claim 19 comprising the network element having the first port and the second port, the network element operable to transfer the firs plurality of data values to be verified and to receive the second plurality of data values to be verified.

21. The system of claim 19 wherein the network element is a slave network element.

22. The system of claim 19 wherein the network element is a master network element.

23. The system of claim 19, wherein the state machine comprises a programmable logic device.

24. The system of claim 19 wherein the testing element further comprises:
at least one data selection element operable to couple to the network element, the data selection element controlled by a testing state; and
at least one state selection element operable to couple to the network element, the state selection element controlled by the testing state.

25. The system of claim 24 wherein the testing state comprises:
a state variable generated to initiate testing.

26. A system comprising:
a first in first out buffer operable to couple a first port of a network element to a second port of a network element, the first in first out buffer further operable to receive a first plurality of data values from the first port of the network element, the first in first out buffer further operable to transfer a second plurality of data values to the second port of the network element, wherein the network element utilizes UTOPIA interface protocol to exchange information with the first in first out buffer;
a state machine coupled to the first in first out buffer, the state machine operable to control the first in first out buffer, the state machine further operable to couple the first port to the second port of the network element, the state machine further operable to transfer at least one state variable to the network element and to delay transfer of the state variable by at least one clock cycle of the network element; and
a data processing element operable to couple to the network element, the data processing element operable to compare the first plurality of data values transferred from the network element with the second plurality of data values received by the network element and to detect an error in the operation of the UTOPIA interface protocol based on the comparison.

27. The system of claim 26 further comprising the network element having the first port and the second port, the network element operable to transfer the first plurality of data values to be verified and to receive the second plurality of data values to be verified.

28. The system of claim 27 wherein the network element is a slave network element.

29. The system of claim 26 wherein the first plurality of data values is the same as the second plurality of data values.

30. The system of claim 27 wherein the state machine comprises a programmable logic device operable to transfer at least one state variable to the network element and to the first in first out buffer, the programmable logic device further operable to receive at least one state variable from the network element and the first in first out buffer.

31. The system of claim 26 further comprising:
at least one data selection element operable to couple to the first in first out buffer and to the network element, the data selection element controlled by a testing sate; and
at least one state selection element operable to couple to the state machine and to the network element, the state selection element controlled by the testing state.

32. A method for testing a network element comprising:
receiving from a network element into a state machine a first state variable;
receiving a first plurality of data values from a first port of the network element into a first in first out buffer, the first in first out buffer controlled by the state machine, when the network element utilizes UTOPIA interface protocol to exchange information with the first in first out buffer;

communicating a second state variable to the network element to indicate that a second plurality of data values to be verified is ready for transfer, wherein the second state variable is communicated with a delay of at least one clock cycle of the network element;

transferring from the first in first out buffer to a second port of the network element the second plurality of values;

comparing the first plurality of data values with the second plurality of data values; and detecting an error in the operation of the UTOPIA interface protocol based on the comparison.

33. The method of claim 32 wherein the network element is a slave network element.

34. The method of claim 32 wherein the first plurality of data values is the same as the second plurality of data values.

35. The method of claim 32 further comprising:

receiving from the network element into the state machine the first state variable in response to a first query from the state machine to the network element.

36. The method of claim 32 wherein the state machine comprises a programmable logic device.

37. The method of claim 32 further comprising:

receiving from the first port of the network element into the first in first out buffer the first plurality of data values via a first data selection element, the first data selection element controlled by a testing state; and transferring from the first in first out buffer into the second port of the network element the second plurality of data values via a second data selection element, the second data selection element controlled by a testing state.

38. The method of claim 37 further comprising generating a testing state, the testing state operable to control the first and second data selection elements.

39. A system, comprising:

means for receiving from a network element into a buffer a first clock signal of the network element;

means for receiving into the buffer from a first port of the network element a first plurality of data values to be verified in response to the first clock signal, wherein the network element utilizes UTOPIA interface protocol to exchange information with the buffer;

means for communicating a state variable to the network element indicating that a second plurality of data values to be verified is ready for transfer, wherein the state variable is communicated with a delay of at least one clock cycle of the network element;

means for transferring the second plurality of data values to be verified to a second port of the network element in response to a second clock signal;

means for comparing the first plurality of data values with the second plurality of data values; and means for detecting an error in the operation of the UTOPIA interface protocol based on the comparison.

40. Software embodied in a computer-readable medium, operable to:

receive from a network element into a buffer a first clock signal of the network element;

receive into the buffer from a first port of the network element a first plurality of data values to be verified in response to the first clock signal, wherein the network element utilizes UTOPIA interface protocol to exchange information with the buffer;

communicate a state variable to the network element indicating that a second plurality of data values to be verified is ready for transfer, wherein the state variable is communicated with a delay of at least one clock cycle of the network element;

transfer the second plurality of data values to be verified to a second port of the network element in response to a second clock signal;

compare the first plurality of data values with the second plurality of data values; and detecting an error in the operation of the UTOPIA interface protocol based on the comparison.

* * * * *

UNITED STATES PATENT AND TRADEMARK OFFICE
CERTIFICATE OF CORRECTION

PATENT NO. : 6,700,872 B1
DATED : March 2, 2004
INVENTOR(S) : William P. Hann et al.

It is certified that error appears in the above-identified patent and that said Letters Patent is hereby corrected as shown below:

Column 10,
Line 8, after "buffer", insert -- further --.

Column 11,
Line 34, after "system", delete "composing" and insert -- comprising --.
Line 59, after "19", insert -- further --.
Line 61, after "the" delete "firs" and insert -- first --.

Column 12,
Line 45, after "claim", delete "27" and insert -- 26 --.
Line 49, after "claim", delete "27" and insert -- 26 --.
Line 58, after "testing", delete "sate" and insert -- state --.

Column 13,
Line 2, after "machine", delete "when" and insert -- wherein --.
Line 11, after "of", insert -- data --.

Signed and Sealed this

Seventeenth Day of August, 2004

JON W. DUDAS
*Acting Director of the United States Patent and Trademark Office*